United States Patent [19]
Seid et al.

[11] Patent Number: 5,768,271
[45] Date of Patent: Jun. 16, 1998

[54] VIRTUAL PRIVATE NETWORK

[75] Inventors: Howard A. Seid, Fairfax, Va.; Albert Lespagnol, Le Bretonneux, France

[73] Assignee: Alcatel Data Networks Inc., Ashburn, Va.

[21] Appl. No.: 632,168

[22] Filed: Apr. 12, 1996

[51] Int. Cl.⁶ .................................................. H04L 12/56
[52] U.S. Cl. ........................................ 370/389; 370/397
[58] Field of Search .................................. 370/389, 390, 370/392, 393, 394, 395, 396–400, 352, 356, 357, 355, 402, 409, 428

[56] References Cited

U.S. PATENT DOCUMENTS

| | | | |
|---|---|---|---|
| 4,348,554 | 9/1982 | Asmuth | 370/96 |
| 4,823,338 | 4/1989 | Chan et al. | 370/85.2 |
| 5,274,643 | 12/1993 | Fisk | 370/94.1 |
| 5,337,307 | 8/1994 | Sato et al. | 370/60 |
| 5,357,564 | 10/1994 | Gupta et al. | 379/188 |
| 5,394,402 | 2/1995 | Ross | 370/94.1 |
| 5,432,783 | 7/1995 | Ahmed et al. | 370/60.1 |
| 5,432,785 | 7/1995 | Ahmed et al. | 370/60.1 |
| 5,436,909 | 7/1995 | Dev et al. | 371/20.1 |
| 5,440,547 | 8/1995 | Easki et al. | 370/60 |
| 5,442,637 | 8/1995 | Nguyen | 370/94.1 |
| 5,446,734 | 8/1995 | Goldstein | 370/60.1 |
| 5,452,293 | 9/1995 | Wilkinson et al. | 370/395 |
| 5,477,536 | 12/1995 | Picard | 370/60 |

*Primary Examiner*—Dang Ton
*Attorney, Agent, or Firm*—Ware, Fressola Van Der Sluys & Adolphson LLP

[57] ABSTRACT

In a packet switching (packet-based) network, such as a frame relay (FR) network, which includes network resources made up of networked elements and customer premises equipment interconnected by one or more physical paths, a Virtual Private Network (VPN) is built above the underlying packet-based network and includes selected portions of the packet-based network resources. The VPN is a collection of logical nodes and virtual paths (VPs) and includes one or more virtual circuits (VCs), each VC being a logical connection between VC terminators including network elements and customer premises equipment. Segments of the VCs are carried by VPs, each VP being a logical connection established between two VP terminators which are located in either network elements or customer premises equipment. One or more VPs are multiplexed on a physical path (PP). Each VP is allocated a positive guaranteed bandwidth (VP-CIR), and each VC on a VP is also allocated a bandwidth (VC-CIR) greater than or equal to zero. Packets of information to be transmitted over a VC are provided with a unique address field to thereby identify the VCs and VPs associated with the VPN over which the packet of information will travel. Congestion control of the network is provided such that congestion control and management are carried out on a per VPN basis, and congestion outside of a VPN's logical domain does not affect the performance of the VPN.

27 Claims, 8 Drawing Sheets

FIG. 5
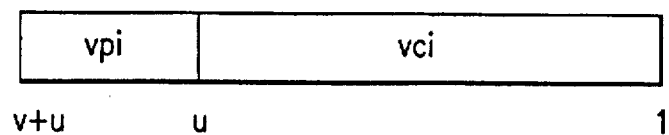
FIG. 6
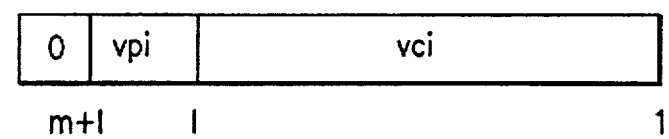
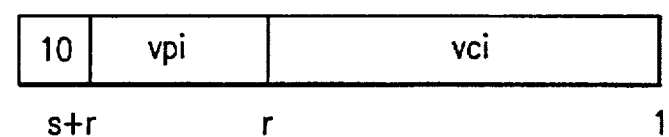
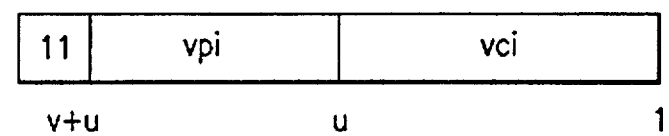

5,768,271

VIRTUAL PRIVATE NETWORK

TECHNICAL FIELD

The present invention generally relates to packet switching (packet-based) networks, and more particularly, to logical sub-networks of a packet switching network called virtual private networks (VPN).

BACKGROUND OF THE INVENTION

Until recently, the networking choices available to a packet switching (packet-based) network customer were limited to either subscribing to some network (public or private) or becoming a private network owner. Examples of packet-based networks include: frame relay (FR) networks wherein a packet corresponds to a FR frame; a cell-switching network, e.g., an asynchronous transfer mode (ATM) network, wherein a packet corresponds to an ATM cell; etc. For small networking needs, subscription was the usual choice. Its main advantage is that it frees the customer of having to deal with engineering, operating and managing the network. In addition, since the network provider might be able to provide the service at very competitive rates compared to private purchase of telecommunication equipments, there is a potential economic saving.

How advantageous the subscription to a network might be, there are circumstances when it may be preferable to turn to private network ownership. Firstly, a customer is at the mercy of the responsiveness of the network in supporting specialized equipment, feature or function. An owner, on the contrary, has complete freedom in implementing the service and features it requires. Secondly, a customer may need specific network capabilities (e.g., in the areas of accounting and security) which are not satisfactorily available. An owner can control and enhance the capabilities for which there is desired customer support. Finally, when a customer has a large networking requirement, it may achieve better economics of scale by buying its own communication equipments.

In order to overcome the disadvantages associated with network subscription and network ownership, there is an emerging trend among network operators to sell connectivity and bandwidth in the form of Virtual Private Networks (VPN). The VPN offers a middle ground between network subscription and network ownership. Today, most often, a VPN is simply a collection of network resources taken from an underlying network. This collection can range anywhere from a set of isolated subscriber ports to a set of connected network equipment (ports, trunks, nodes) constituting a sub-network in itself.

An underlying FR network may support many VPNs, which may or may not share common equipment. Typically, the traffic generated by a VPN user is handled just as the traffic generated by any user of the underlying FR network. No network distinction is provided to the logical VPN entity. Hence a VPN will is provide the same quality of service as the underlying network. For example, if a trunk is congested because a particular connection generates too much traffic, all the connections sharing this trunk will be impacted (e.g., increase of the queuing delay and of the loss rate). There is no isolation among the traffic pertaining to a VPN, another VPN, or unrelated underlying network traffic within the PR network.

The typical VPN configurations, currently offered, are illustrated in FIG. 1.

Here, VPN1, is a collection of subscriber ports, trunks, a complete network element, and partial resources of two other network elements. VPN1 can be viewed as a sub-network of the underlying FR network since there is connectivity within the boundary of the VPN. The situation depicted by VPN2 is that of a collection of subscriber ports and partial resources of two network elements. The VPN2 itself is not a network in the usual sense of the word. There is no connectivity within the boundary of the VPN2 between subscribers on one of the network elements and those which are connected to the other network element. Thus, VPN2 is merely a management domain of the FR underlying network. There is little or no assurance that there will be the proper amount of network resources to support the traffic or connectivity needs of VPN2. Of course, the underlying physical FR network provides the required connectivity; however, the VPN2 network manager is not permitted a clear view of the actual "network".

VPN3 illustrates a classic "private network" carved from the resources of the underlying FR network. Here, VPN3 is really its own network with the potential of semi-autonomous network management. It is possible to reserve the exclusivity of the subnetwork resources to the VPN subscribers. Note that the granularity of the reserved resources is always the entire physical resource (trunk, port). The underlying FR network provides the equipment and transmission facilities and is ultimately responsible for the overall health of the VPN. The underlying FR network assumes the burden of these tasks so that the VPN 3 manager only participates to the level to which it desires.

VPN4 is a sub-VPN of VPN3. It is included to show that VPN offerings parallel private network offerings. A sub-VPN can manage some portion of a VPN and even provide specialized services not required or offered by the remainder of the underlying VPN to which it is associated.

While a VPN provides significant advantages as described above, a drawback associated with VPNs is that most of the time a VPN guarantees only access not performance. The VPN traffic must share resources in an unpredictable way with other VPNs or non-VPN subscriber traffic. The exception is when trunking and switching capacities are reserved for the VPN and when the VPN traffic is constrained to use these capacities, e.g. VPN3.

There therefore exists a need for a virtual private network which permits VPN users to obtain a level of service generally unperturbed by the traffic generated by users outside the VPN's logical domain.

SUMMARY OF THE INVENTION

Objects of the present invention include providing an improved virtual private network (VPN) for a packet switching (packet-based) network, the VPN providing an enhanced level of management control and function to a manager of the VPN and the VPN providing a level of service which is generally independent of other traffic on the network outside of the VPN's logical domain.

According to the present invention, in a packet switching (packet-based) network, such as a frame relay (FR) network, which includes network resources made up of networked elements and customer premises equipment interconnected by one or more physical paths, a VPN is built above the underlying network and includes selected portions of the network resources. The VPN is a collection of logical nodes and virtual paths (VPs) and includes one or more virtual circuits (VCs), each VC being a logical connection between VC terminators including network elements and customer premises equipment. Segments of the VCs are carried by VPs, each VP being a logical connection established between two VP terminators which are located in either network elements or customer premises equipment. One or more VPs are multiplexed on a physical path (PP). Each VP is allocated a positive guaranteed bandwidth (VP-CIR), and each VC on a VP is also allocated a bandwidth (VC-CIR) greater than or equal to zero. Packets of information to be transmitted over a VC are provided with an address field having local significance for identifying the respective VCs and VPs used by the VPN to which the packets of information are associated. Congestion control of the network is provided such that congestion control and management are carried out on a per VPN basis, and congestion outside of a VPN's logical domain does not affect the performance of the VPN.

In accordance with a first embodiment of the present invention, the address field includes a fixed length VC identifier field (vci) and a fixed length VP identifier field (vpi) to uniquely identify the VC and VP over which the packet of information will travel.

In accordance with a second embodiment of the present invention, the address field is made up of variable length subfields including a class-type field, a vpi field and a vci field. The class-type field identifies the length of the vpi and vci fields.

In accordance with a third embodiment of the invention, the address field is an integrated field which identifies both VPs and VCs, the integrated field being encoded to uniquely identifying how a packet of information is switched within a node of the network. In particular, each node is provided with a connection table which identifies, for each input VC of each input VP, a corresponding output VC, output VP and output port of the node. Alternatively, the connection table will indicate if the VC is terminated within the node.

In further accord with the present invention, each VP on a PP of the network is allocated a positive guaranteed bandwidth (VP-CIR), and when congestion occurs on the PP, only those VPs utilizing bandwidth greater than the guaranteed bandwidth are required to reduce submission rate of packets onto the network. Therefore, even if the PPs utilized by a VC are congested, if the VP used by the VC is lightly loaded, the VC can utilize bandwidth at least equal to, and possibly greater than, its allocated bandwidth (VC-CIR).

According further to the present invention, the bandwidth utilization of each VP within a VPN is monitored, and when one VP is utilizing less than its guaranteed bandwidth, any excess bandwidth is equally shared among the remaining VPs in proportion to their guaranteed bandwidth with respect to the total bandwidth on the PP carrying the VP.

According still further to the present invention, a VP is established within the network locally at each node traversed by the VP by first finding an outgoing trunk from the node with available bandwidth to support the guaranteed bandwidth of the VP and able to support the number of VCs carried by the VP; reserving these resources on the PP; and updating the connection table in the node by mapping the incoming VCs and VPs to the outgoing VCs and VPs of the node.

According still further to the present invention, a VC is established within a VPN by first identifying a VP towards the destination having at least the available bandwidth required by the VC and an unused VC segment, and then reserving these resources for the VC and updating the connection table within the nodes. At the VP termination either the destination is reached or the VC is switched as described above onto a new VP toward the destination until the ultimate destination is reached According still further to the present invention, a signaling VC is reserved on each VP for management functions.

The VPN of the present invention provides a significant improvement over the prior art. The present invention provides for the identification of packets on the network to specific VPNs. Therefore, a VPN in accordance with the invention provides a level of service generally unperturbed by traffic generated by users outside of the VPN's logical domain. The VPN concept, of the present invention, provides a natural way to offer features and functionality, normally attained only through some manner of total network ownership. Although the provision of the physical network, supporting the VPN, takes on a layer of additional complexity with the definition of VPs, the rewards gained in the specification and management of a VPN, defined in this manner, show the power of this approach. By use of the VPN concept, VPN network management becomes more than the display of random disjoint information from the underlying network. It offers the capability of providing the VPN manager with a view of the logical network to which it has subscribed, thereby permitting it to take coherent action to provide accurate and adequate support to its VPN user community.

The foregoing and other objects features and advantages the present invention will become more apparent in light of the following detailed description of exemplary embodiments thereof, as illustrated in the accompanying drawings.

BRIEF DESCRIPTION OF THE DRAWINGS

FIG. 5 is a diagram illustrating an address field having fixed length fields for identifying virtual circuits and virtual paths;

FIG. 6 are schematic block diagrams of address fields having variable lengths fields for identifying virtual paths and virtual circuits;

DETAILED DESCRIPTION OF THE INVENTION

For purposes of simplifying the description of the present invention, a number of abbreviations are used in the following description. The following table of abbreviations is provided as a reference for the reader:

| ABBREVIATION | MEANING |
| --- | --- |
| Bc | Committed Burst Size |
| Be | Excess Burst Size |
| becn | Backward Explicit Congestion Notification |
| $BVP_i$ | Bandwidth (VP-CIR) of the i-th VP |
| CIR | Committed Information Rate |
| CPE | Customer Premises Equipment |
| CPU | Central Processing Unit |
| EBW | Excess Bandwidth |
| EIR | Excess Information Rate equal to ((Bc + Be)/T) where T is Bc/CIR |
| dlci | Data Link Connection Identifier |
| fecn | Forward Explicit Congestion Notification |
| FR | Frame Relay |
| FRC | Frame Relay Connection |
| GNCC | General Network Control Center |
| $neq_{vp}$ | Index Set of Non-Empty VP Queues |
| PP | Physical Path |
| sap | Service Access Point |
| SR | Service Rate |
| TR | Bit Rate of the Trunk |
| VC | Virtual Circuit |
| vci | VC Identifier |
| VNCC | VPN Network Control Center |
| VP | Virtual Path |
| vpi | VP Identifier |
| VPN | Virtual Private Network |

The present invention provides a VPN for a FR network. The VPN is built above the underlying FR network and permits the VPN user to obtain a level of service generally unperturbed by the traffic generated by users outside the VPN's logical domain. As will become apparent to those skilled in the art in the following description, a VPN in accordance with the invention is a collection of logical nodes and virtual paths. Within the nodes of the FR network, identification information is used to uniquely identify specific traffic with a VPN. Therefore, congestion control and management can be carried out on a per VPN basis and congestion outside of a VPN's logical domain will not affect the performance of the VPN.

Figure 1:
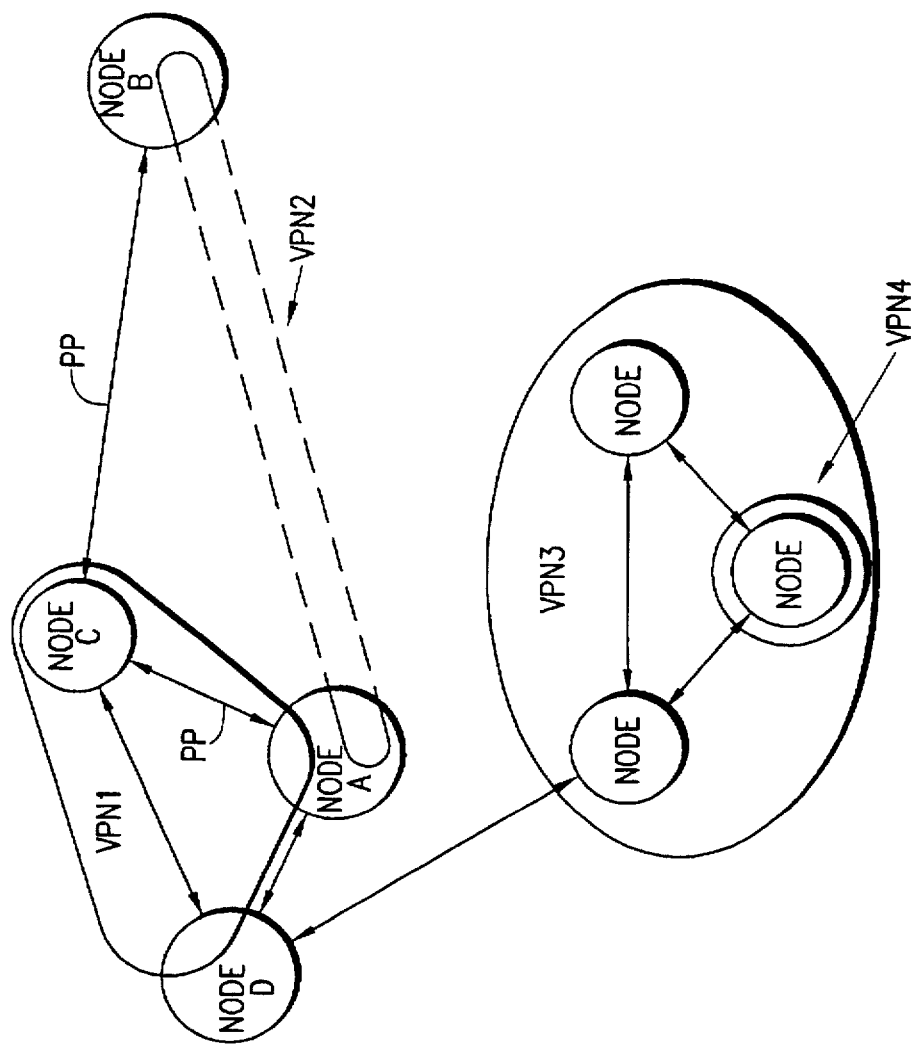
FIG. 1 is a schematic block diagram of a frame relay network having a plurality of prior art virtual private networks.
Figure 2:
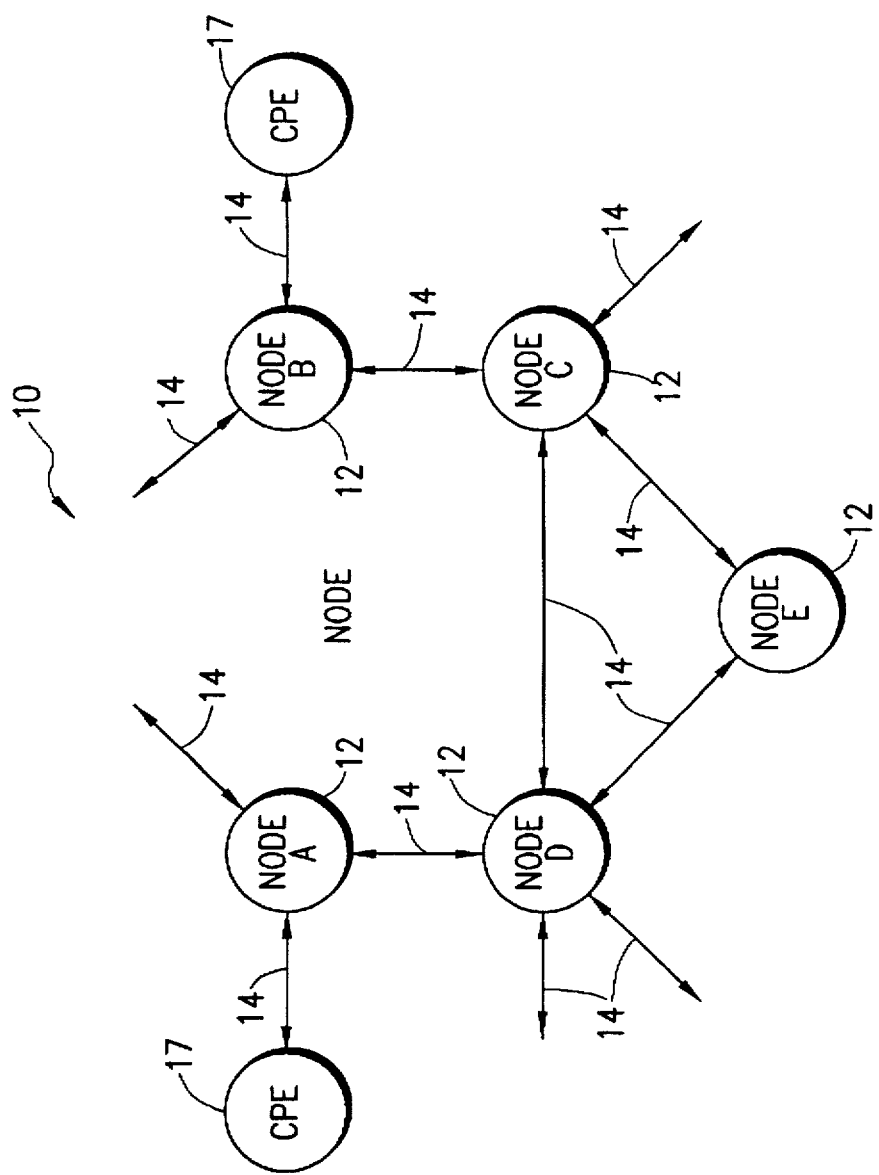
FIG. 2 is a schematic block diagram of the physical network topology of a portion of a frame relay network.
Figure 3:
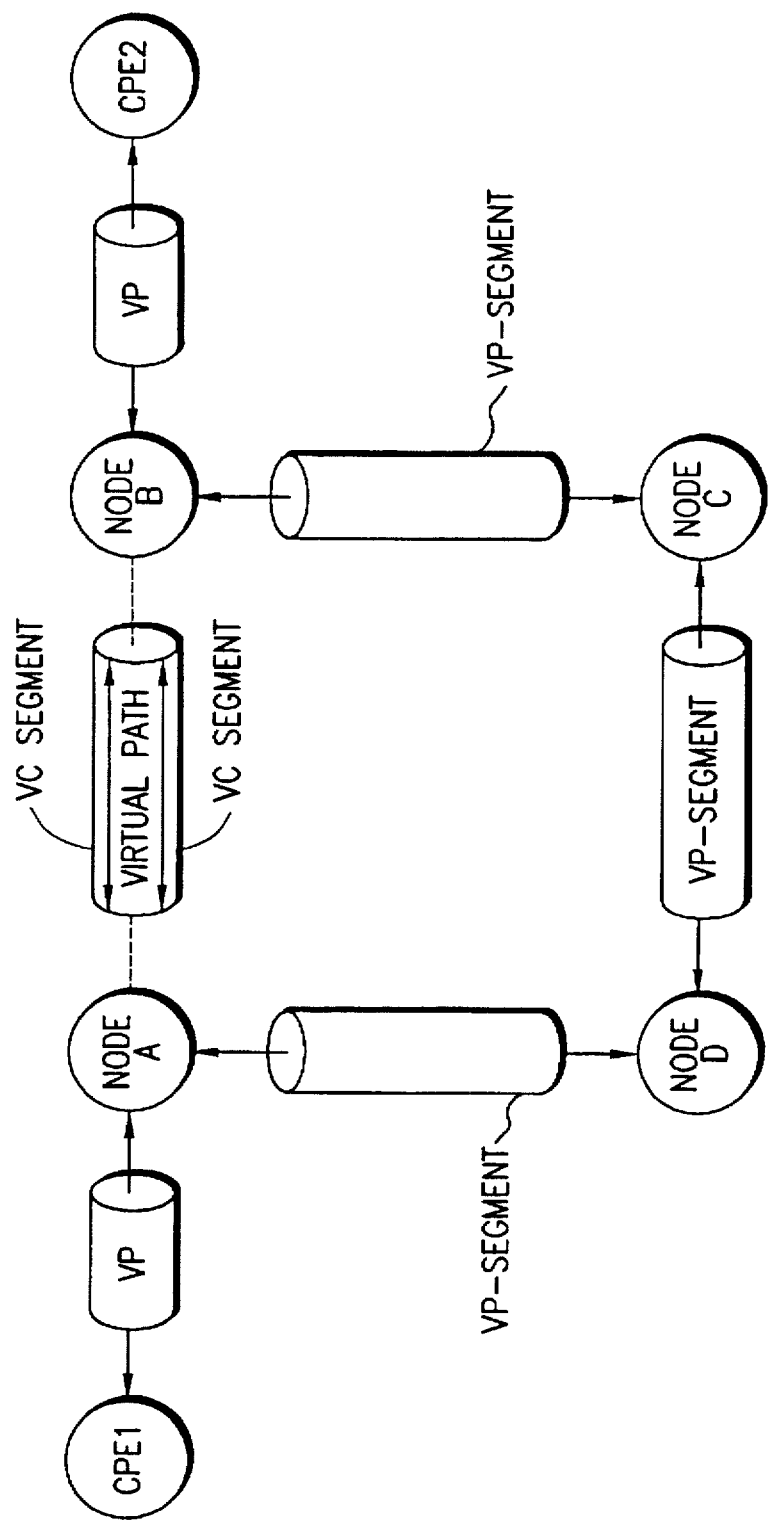
FIG. 3 is a schematic block diagram of a virtual path containing virtual circuits of the frame relay network of FIG. 2.

Referring to FIGS. 2 and 3, a portion of a typical FR network 10 is shown. The FR network 10 includes network elements (nodes) 12 interconnected by one or more physical paths (PP) 14. A PP 14 is any communications link or channel capable of supporting a virtual circuit (VC) segment between Customer Premises Equipment (CPE) 17 and a network element 12 or between two adjacent network elements 12. A VC is a logical connection established between two VC-terminators. A VC-terminator is usually located in a CPE 17, in which case the VC-terminator may be a source or destination of network traffic (data). Alternatively, a VC-terminator may be located in a network element 12, as is the case when the VC is used to transfer management data between a network element 12 and a network management center (not shown). A VC-segment is the portion of the VC carried by a virtual path (VP) between two adjacent VP-terminators. A VP is a logical connection established between two VP-terminators. A VP-terminator is either located in a network element 12 or CPE 17. A VP-segment is the portion of a VP using a particular PP between two adjacent CPEs; between a CPE 17 and a network element; or between two adjacent network elements 12.

The Committed Information Rate (CIR) is the guaranteed bandwidth available for data transfer between two endpoints of a FR network. A CIR value of zero implies that there is no guaranteed bandwidth. A bandwidth (VC-CIR) is allocated to each VC. A non-zero VC-CIR is allocated to a VC if at least a portion of data transfer is to be guaranteed. As will be understood by those skilled in the art, the minimum VC-CIR is zero, in which case there is no guarantee of data delivery. A guaranteed (positive) bandwidth (VP-CIR) is allocated to each VP.

Several VPs can be multiplexed on a PP (i.e., trunk) provided that the sum of all the VP-CIRs does not exceed the bandwidth of the PP. Usually a VP will span multiple successive PPs. Similarly several VCs can be multiplexed on a VP and, usually, a VC will span multiple successive VPs. A VP multiplexes segments of VCs under the condition that the sum of all the VC-CIRs of the multiplexed VCs does not exceed the VP-CIR. The actual paths of the VC-segments follow the PPs making up the VP.

Referring still to FIGS. 2 and 3, although there is no direct physical connectivity between nodes A and B, it is possible to create virtual connectivity between these nodes by establishing a VP between them. The VP is made up of three VP-segments (A to D, D to C and C to B) corresponding to the three PPs it uses. A VC can be established between CPE1 and CPE2 which uses the PP CPE1 to A, the VP from A to B previously established, and the PP B to CPE2.

From a bandwidth standpoint, the VP reserves a committed bandwidth VP-CIR which must be available on the three PPs it uses. Similarly, for the VC to be set up, there must be bandwidth at least equal to VC-CIR on VP CPE1-A, VP A-B and VP B-CPE2. From the two concepts of VC and VP one can now structure the FR network using a protocol layer model.

Figure 4:
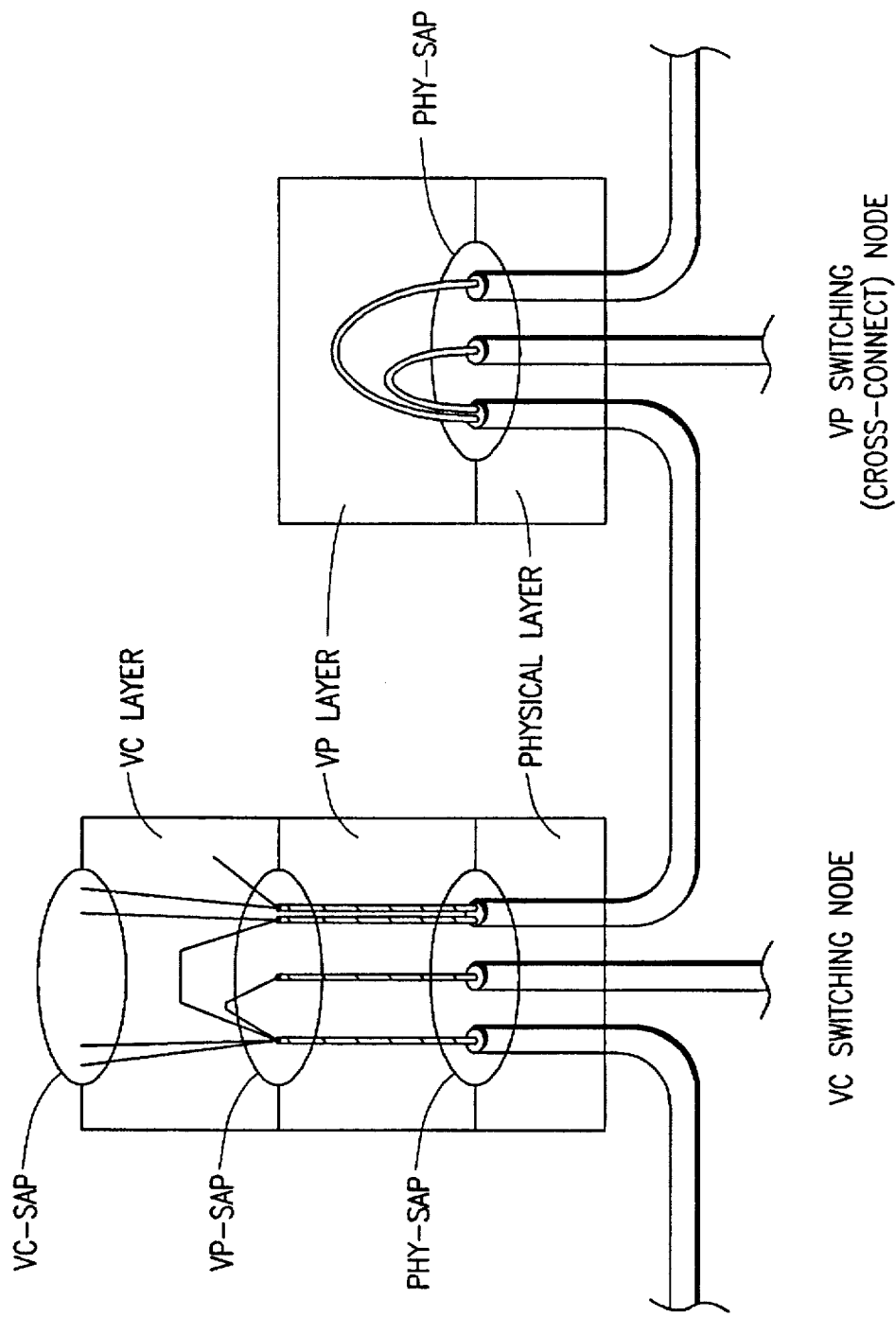
FIG. 4 is a schematic block diagram of a frame relay network protocol layer model.

Referring now to FIG. 4, a protocol layer model of the FR network is illustrated which includes two nodes of the FR network. The FR function of a FR node is composed of three layers. The highest order layer is the VC layer. This layer performs a VC switching function (determination of outgoing VPs and analysis and translation of VC identifiers) or a VC terminating function. It provides end-to-end VCs between peer upper layers. The boundary between the VC layer and the upper layer is called VC-sap (service access point). The next layer is the VP Layer. This layer performs the VP switching or cross-connect function (determination of outgoing PPs and analysis and translation of VP identifiers) or a VP terminating function. The boundary between the VP layer and the VC layer is called VP-sap. Note that the VCs are invisible to the VP layer. The final layer is the Physical Layer. The Physical Layer provides a transmission path between adjacent VP layers. The boundary between the physical layer and the VP layer is called Phy-sap.

A node can implement the physical and VP layers only: it acts then as a VP switching (cross-connect) node. In a different configuration, a node can implement the physical layer, the VP-termination part of the VP layer and the VC layer: it acts, in this case, as a VC switching node. Finally, a node can implement the three complete layers: it acts, in this case, as a hybrid node, switching VCs and cross-connecting VPs.

A. Implementation of the VPN In a Frame Relay Network

The introduction of the VPN concept discussed above with respect to FIGS. 2, 3 and 4 impacts directly the implementation of the three planes of the FR network: transfer, control and management. The extent of the impact depends largely on the sophistication of the service provided. Following is a discussion of the three FR network planes and the implementation of a VPN in accordance with the invention with respect to the three FR network planes.

1. Transfer Plane a. Identification of Virtual Paths and of Virtual Circuits

As described above, several VPs can be multiplexed on a PP and several VCs can be multiplexed on a VP. In order to implement a VPN in accordance with the invention, each VC within a VP must be uniquely identified at the VP-sap and, similarly, each VP within a transmission path must be uniquely identified. As described hereinafter, each node within the FR network uses the VC and VP identification information for properly switching and routing VPs and VCs. Additionally, by using such an identification scheme, the VPN can be implemented within the FR network in a manner that actions such as congestion control and management can be carried out on a per VPN basis because traffic associated with a VPN is uniquely identified. Therefore, congestion outside of a VPN's logical domain will not affect the performance of the VPN.

The Q.922 frame structure defined in *ISDN Link Layer Specification for Frame Mode Bearer Service*, ITU-T-Q.922 (formerly CCITT Q.922), 1992, the disclosure of which is incorporated herein by reference, used in Frame Relay data transfer, has an address field of 10, 16 or 23 bits, the value of which is called the data link connection identifier (dlci). In the standard Frame Relay service, this field is used as the local identifier of a virtual connection on a physical path. However, in accordance with the invention, the dlci may be used to identify VPs and VCs. In accordance with the invention, there are three alternatives for structuring and interpreting the dlci, each one achieving a particular trade-off between the utilization efficiency of the bits of the address field and the complexity of interpretation of this field. These three alternatives assume that the FR network is assembled with FR products implemented with a 2-byte control field, i.e., a dlci of 10 bits.

(1) Fixed Length Fields Identify VPs and VCs

Referring to FIG. 5, the fixed length dlci may be divided into a VC identifier (vci) of u bits and a VP identifier (vpi) of v bits. The two sub-fields have a fixed length and are always at the same place in the address field, which makes the interpretation of the dlci simple. The shortcoming of this option is that u bits are systematically reserved per VP allowing up to $2^u$ VCs to be multiplexed on every VP even if a much smaller number of VCs is actually multiplexed per VP. Thus the bit utilization efficiency is poor.

(2) Variable Length Fields used to Identify VPs and VCs

Referring now to FIG. 6, the fixed length dlci may include a variable length vci field and vpi field. This option overcomes the limitations of the fixed length fields. The address field is structured in 3 subfields: a class type subfield, a vpi subfield and a vci subfield. The class type (the first 1 or 2 bits of the address field) indicates the size of the two remaining fields.

FIG. 6 illustrates the application of this scheme to identify three classes. In this example, the three class type fields, with binary values 0, 10 and 11, indicate that on a single trunk (physical path) one can multiplex $2^m$ VPs bearing $2^1$ VCs; $2^8$ VPs bearing $2^r$ VCs; and 2 v VPs bearing $2^u$ VCs, respectively. This scheme allows a more efficient usage of the bits of the address field by adapting the vpi field size to the real user needs, while keeping the interpretation function quite simple.

(3) A Single Integrated Field Identifies VPs and VCs

The two preceding options for identifying VPs and VCs have two possible drawbacks. First, both the fixed length and variable length options assume that the VPN concept is generalized throughout the underlying network and that each node can correctly interpret the address field. It is more likely that only a fraction of the resources of the network will be dedicated to VPNs, the other fraction being used by non-VPN subscribers. Secondly, most FR switches process address fields of 10 bits. Thus it is hard to simultaneously satisfy the need for a large number of VPs each carrying a large number of VC segments. Therefore, another identification scheme is provided in accordance with the present invention which enables the coexistence of VPNs and the original underlying network and provides the flexibility to handle the needs of them both, whereby there is no specific sub-field identifying a VP within the address field. On the contrary VP and VC identifiers are merged into a unique field which is correctly interpreted in the network elements by way of a proper encoding of connection tables.

A FR node can play the three roles of: (1) FR connection switch; (2) VP cross-connect whereby a VP is switched as a global entity (i.e., the VCs bundled in the VP are not visible); and (3) VC-switch whereby an ingress VP is terminated with its multiplexed VCs unbundled. These VCs are then either terminated or switched to egress VPs.

Figure 7:
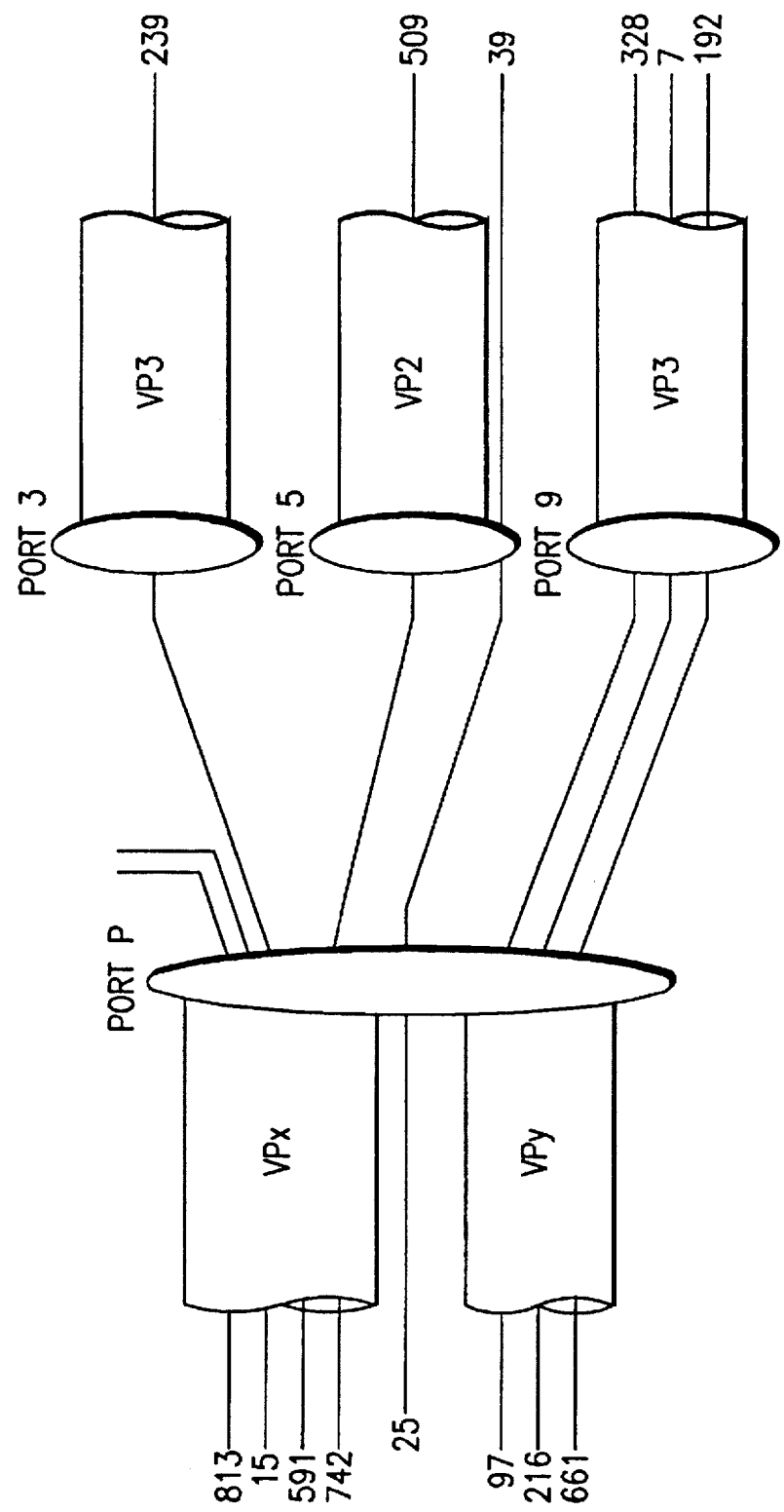
FIG. 7 is a schematic block diagram showing the switching of virtual circuits within a node of the frame relay network.

FIG. 7 illustrates a situation encompassing the three roles of the node. As a VP cross-connect node, it switches a VP identified as an ordered pair, e.g., ordered pair (ingress VP y, port p) is switched to (egress VP 3;, port 9). The three VCs multiplexed on this VP are identified by the dlci values of 97, 216 and 661 on the ingress VP-segment and by dlci values of 328, 7 and 192 on the egress VP-segment. In the following connection table, these three VCs are bound together by a triplet (ivpi, evpi, eport) which has the value (y, 3, 9) in this case.

| INGRESS PORT CONNECTION TABLE | | | | |
|---|---|---|---|---|
| idlci | ivpi | edlci | evpi | eport |
| 15 | x | — | — | — |
| 25 | — | 39 | dvpi | 5 |
| 97 | y | 328 | 3 | 9 |
| 216 | y | 7 | 3 | 9 |
| 591 | x | 239 | 3 | 3 |
| 661 | y | 192 | 3 | 9 |
| 742 | x | 509 | 2 | 5 |
| 813 | x | — | — | — |

As a VC-switch node, it terminates ingress VP x and considers, one by one, the four VCs multiplexed on this VP. Two VCs (with idlci values of 813 and 15) are terminated in the node, identified by the fact that the triplet (edlci, evpi, eport) is Nil for each. The two others (with idlci values of 591 and 742) are switched and multiplexed with new dlci values on different egress VPs (239, 3, 3) and (509, 2, 5) respectively.

Finally, as a standard FR connection switch, the node switches a connection identified by ingress dlci 25 on ingress port p to egress dlci 39 on egress port 5. In this case, the evpi value is denoted by the special value dvpi, associated with all standard FR connections. The purpose of this dvpi designation will be explained in greater detail hereinafter.

Each connection, whatever its type (VP, VC or standard FR connection), is identified on the PPs by the dlci. It is the connection table, present only at each VP-terminator port, which maps the dlci to its specific role. In transit nodes, the normal routing processes for FR frames are used. All the bits in the address field of the frame are used efficiently without a noticeable increase of the complexity of interpretation of this field during the actual data transfer. Once the connection has been configured properly and a connection table is established (as described hereinafter), the switching function can take place using each dlci as described in the examples of FIG. 7 and with respect to the connection table above.

A frame with the dlci 813 is received on the ingress port (ivpi) p. Since the fields edlci, evpi and eport, corresponding to the entry 813 in the connection table, are set to Nil, this connection (and the VP it is multiplexed on) is terminated in the node. Therefore the frame is delivered to the upper layer.

A frame with the dlci 591 is received on ivpi p. The fields edlci, evpi and eport, corresponding to the entry 591 in the connection table, indicate that the frame must be forwarded on the egress VP (evpi) 3 of egress port (eport) 3 with an egress address field (edlci) set to 239.

A frame with the dlci 97 is received on ivpi p. The fields edlci, evpi and eport, corresponding to the entry 97 in the connection table, indicate that the frame must be forwarded on evpi 3 of eport 9 with edlci 328.

A frame with the dlci 25 is received on ivpi p. The fields edlci, evpi and eport, corresponding to the entry 25 in the connection table, indicate that the frame must be forwarded on evpi dvpi of eport 5 with edlci 39.

It will be noted that, in the above cases, the processing of a frame is unique, irrespective of whether the frame belongs to a VC, a VP or a standard FR connection. In this respect the switching function is integrated.

(4) Increased Length Address Field

As discuss above, with a 10 bit address field, it may be preferable to implement a single integrated (encoded) address field for identifying VPs and VCs because of the drawback associated with both fixed length and variable length address fields. However, this solution could be reconsidered if the address field becomes 16 or 23 bits long. In this case, the size of the connection table in each port ($2^1$ where 1 is the length, in bits, of the address field) becomes unacceptably large. At the same time, the need for efficiency of bit utilization of the address field associated with this embodiment disappears.

With a longer address field, the variable length field approach described above may be preferable to an integrated address field. For example, the above described variable length address field may be provided with a fixed length class type field. For example, with a 2-bit class type, one category (e.g., class type having binary value 00) could be used to identify those connections which are unaffiliated with a VPN. The other three class types, i.e., binary values 01, 10, 11, would then be associated with three different sizes of vpi as described in the variable length discussion.

An immediate benefit of the size of the connection tables using this modified variable length approach is that a pure VP cross-connect node needs to deal only with the vpi portion of the address field, enabling drastic reduction of the size of the connection table. Another benefit is that a hybrid node (VP cross-connect and VC-switch) can process the address field in two stages, an evaluation of the pi followed, only when the VP is terminated, by an evaluation of the vci. The size of the connection table will be significantly reduced since at any port only a small number of VPs are actually terminated. Finally, for a node dealing with standard FR connections, the size of the connection table is determined by the number of significant bits in the address field for class type 00.

(5) Summary of the VP and VC Identifiers

Three different schemes for identifying VPs and VCs in accordance with the present invention are described above. For a short address field, i.e., 10 bits, it may be preferable to use a single integrated (encoded) address field for identifying VPs and VCs. However, for longer address fields, e.g., 16 or 23 bits, it may be preferable to use a variable address field with a fixed length class type field. As will be understood by those skilled in the art, all that is required in order to implement the VPN of the present invention is a method to properly identify VPs and VCs within nodes so that traffic may be properly routed and associated with appropriate VPs and VCs for purposes of traffic management and congestion control.

b. Traffic Management and Congestion Control

Figure 8:
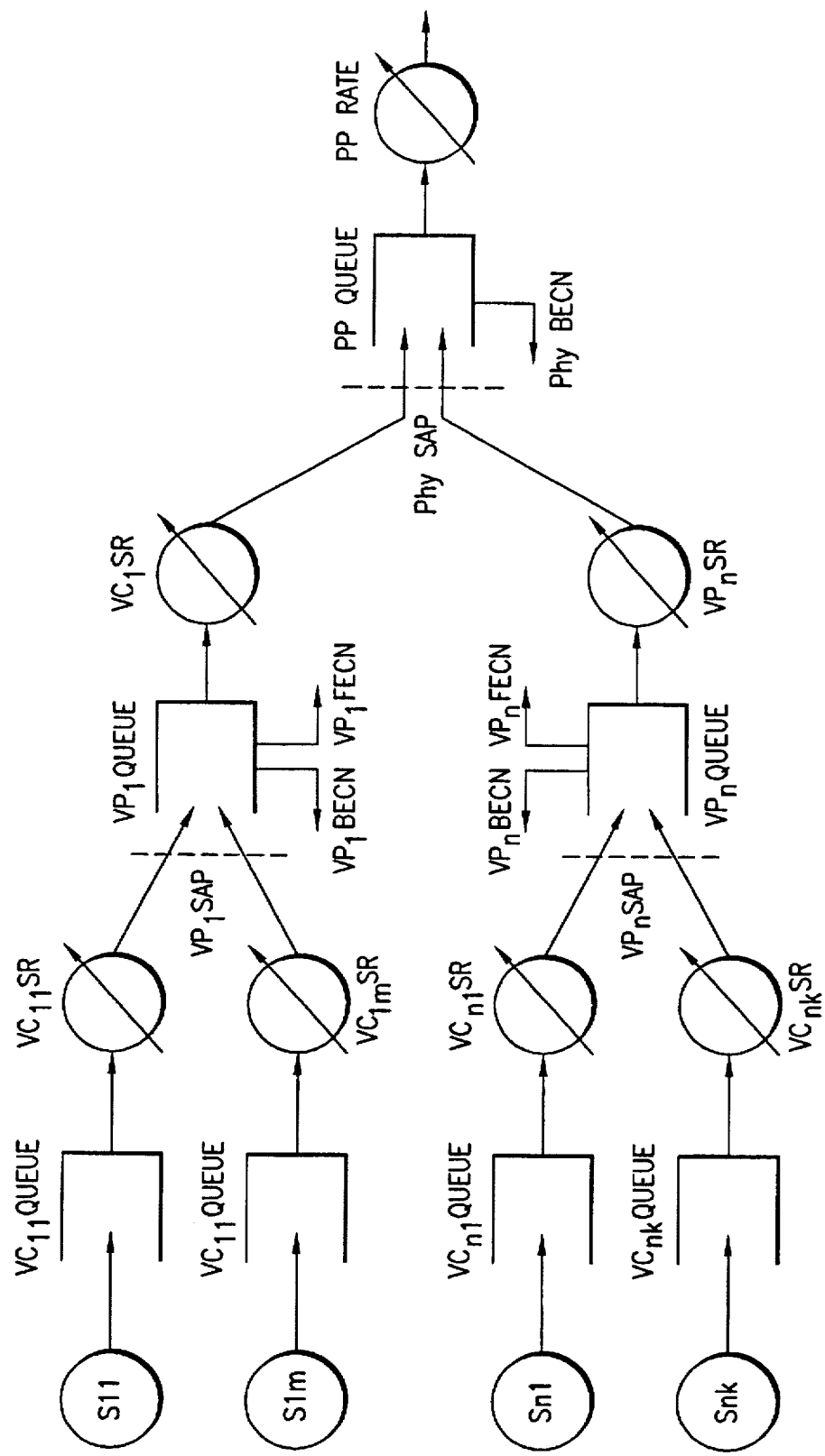
FIG. 8 is a schematic block diagram illustrating the traffic policing and congestion control within the virtual private network of the invention.

Traffic management and congestion control are two tightly related functions of the FR transfer plane. With the introduction of the VPN concept, the traffic management and congestion control functions must be implemented at several levels in the network as illustrated in FIG. 8. The following discussion relates to backward congestion notification processing, the notification to a source of a data stream, e.g., a VC-terminator, that there is congestion along the VP within the VPN. The forward congestion notification processing, e.g., the notification of congestion to a destination of a data stream, is handled analogously. The VPN of the present invention provides improved traffic management and congestion control because traffic associated with a specific VPN is uniquely identified within the FR network. Therefore, the traffic management and congestion control in accordance with the invention is implemented such that the traffic within a given VPN is unperturbed by traffic generated outside of the VPN's logical domain.

(1) Traffic Management at the Phy-sap

All the frames to be transmitted on a transmission trunk (PP) are multiplexed on a physical service access point (Phy-sap). For the sake of simplicity, channelized trunks are not considered here, although this option is not excluded. The traffic management function at the Phy-sap is illustrated with a queue representation, PP QUEUE.

The role of congestion management at the Phy-sap in accordance with the invention is to ensure that each VP is allocated at least VP-CIR for data transmission over the trunk (PP). Therefore, if congestion occurs on the PP, there will be sufficient bandwidth such that each VPN can at least transmit traffic at VP-CIR on the PP. If a PP is carrying FR traffic other than VP traffic, the total allocated bandwidth on the PP must ensure that each VP is guaranteed at least VP-CIR. Therefore the sum of each VP-CIR and CIR for other FR traffic on the trunk must not exceed the total bandwidth of the PP. If congestion occurs, then only those VPs (or other FR traffic) in excess of their corresponding CIRs must reduce submission rate onto the PP.

The unique queue (PP QUEUE) served at the physical path rate (PP RATE) is associated with the Phy-sap. The PP QUEUE is shared by all the VPs multiplexed on the egress trunk. Its maximum length, i.e. the maximum amount of data stored in the queue and waiting to be transmitted onto the PP, is determined from the maximum allowed sojourn delay and from the service rate (PP RATE) of the queue. A congestion threshold is defined which, when reached, triggers a congestion notification procedure. As long as the aggregate incoming rate is lower than the PP RATE, the queue will remain almost empty. In this case, the queue exists only to absorb the jitter due to packet clustering, a phenomenon inherent to a packet-based network.

When the aggregate incoming rate is sustainably higher than the trunk rate, congestion builds up and a physical path backward explicit congestion notification, Phy-becn, must be issued toward the VP originators. It is important to note that, in order to provide a good isolation of traffic between VPNs, the Phy-sap congestion notification must be received by the VP originators. As a matter of fact, a few of the VPs multiplexed on the Phy-sap may be generating traffic at a rate equal or lower than their CIRs and thus the congestion should remain invisible to their VCs. Only the VPs contributing more than their VP-CIRs must reduce their traffic.

From an implementation point of view there are, potentially, several ways to notify the congestion. As described above, one way is by defining an additional bit (Phy-becn) which is set in all frames transiting in the reverse direction of a congested trunk. This bit is examined by the VP originators. Alternatively, a signaling frame (as described for example in CLLM in ITU-T-Q.922, the disclosure of which is incorporated herein by reference) may be defined which is transmitted by the physical layer toward all originators of the VPs multiplexed on the Phy-sap.

(2) Traffic Management at the VP-sap

All the frames to be transmitted on a virtual path are multiplexed on a virtual path service access point (VP-sap). FIG. 8 illustrates the traffic management function at the VP-sap with a queue representation, VP QUEUE. The traffic of a VP must be considered globally, it cannot be separated into as many traffic components as there are VCs bundled in the VP. This new characteristic entails a new mechanism of traffic management and congestion control in the nodes of the FR network.

It may happen that the trunk bandwidth is not being totally allocated or that certain virtual paths are not fully using their VP-CIRs. In this case the excess bandwidth can be shared among the non-empty VP QUEUES. Fairness is provided by sharing the excess bandwidth in proportion of the VP-CIRs. To each VP corresponds a queue (VP QUEUE) which is served at a service rate (VP SR) equal to VP-CIR at a minimum. Let $neq_{VP}$ be the index set of non-empty VP QUEUEs, $BVP_i$ the VP-CIR of the i-th VP, and TR the Bit Rate of the trunk. The excess bandwidth (EBW) is expressible as:

$$EBW = TR - \sum_{i \in neq_{VP}} BVP_i$$

This bandwidth is usually non-zero since VPs are not always using their full CIRs or since the trunk bandwidth is not being completely allocated. This spare capacity is shared among the non-empty queues in proportion of their VP-CIRs. For example, a non-empty queue for $VP_i$ has a service rate $SR_i$ given by:

$$SR_i = BVP_i + \frac{EBW \times BVP_i}{\sum_{i \in neq_{VP}} BVP_i}$$

When a Phy-sap congestion notification (Phy-becn) is received by a VP originator, it must restrict its SR to no more than VP-CIR. Subsequently it can increase the VP SR if no more Phy-sap congestion notification is received.

The VP QUEUE is shared by all the VCs multiplexed on the virtual path. Its maximum length is determined from the maximum allowed sojourn delay and from the SR of the queue ($VP_i$ SR). A congestion threshold is defined which, when reached, triggers a congestion notification procedure. As long as the aggregate incoming rate is lower than the SR of the queue, the queue will remain almost empty. In this case, the queue is used only to absorb the jitter due to packet clustering.

A VP is congested when the aggregate arrival rate at the VP-sap (sum of the SRs of the VCs multiplexed on the VP) is higher than the current SR of this VP's queue. Congestion is detected when the VP's queue length goes beyond a congestion threshold. A strict determination of this threshold should consider the SR of the queue, the round-trip-delay user to queue, and the maximum allowed sojourn delay of a frame in the node. For simplicity this threshold may be set to a few frames (e.g. 10 frames).

When a VP is congested, the frames exiting the VP's queue towards the PP have a VP forward explicit congestion notification (VP-fecn) bit set to notify the destination of the congestion. Additionally, the frames arriving on the reverse direction on the VP (assuming bidirectional VPs) have their becn (VP-becn) bit set. Each VP is structured to guarantee bandwidth to each VC at least equal to VC-CIR. Therefore, when a VP is congested, only those VCs that are transmitting traffic onto the VP at a rate greater than VC-CIR must reduce their submission rate. In response to VP congestion, VCs will reduce their submission rate in steps until the VP congestion is cleared. However, each VC will be able to utilize bandwidth at least equal to VC-CIR.

As discussed above with respect to a single integrated address field, an ingress VP identity for the incoming frame is given by the field ivpi in the connection table. The VP concept allows the isolation of traffic of one user (or VPN) from the traffic of another user (or VPN). As will be understood by those skilled in the art, one VP, $VP_i$, can be congested while another VP, $VP_k$, sharing the same trunk is not congested. Simultaneously, the configuration of the invention allows a (non-congested) user to have a VP SR higher than the VP-bandwidth it has reserved. This situation occurs when the network is not heavily loaded.

(3) Traffic Management at the VC-sap

As in any network providing a standard FR service, the access node must implement a policing function on a virtual circuit basis, in which it monitors the incoming rate and ensures that the traffic adheres to the standard limits specified by the traffic descriptor associated to the virtual circuit (Bc, Be, VC-CIR). In addition it shapes the traffic submitted to the network as a function of the congestion notifications received from the network. Therefore, a data stream received from a source, $S_{nm}$, (i.e., the $m^{th}$ VC of this $VP_n$) is initially buffered in a VC QUEUE. Thereafter, based on the condition of the network as described above, traffic is provided to the $VP_n$ at a variable service rate, $VC_{nm}SR$.

Note that for a given VC, the access node $S_{nm}$ (and the source traffic) sees only the congestion notifications (VP-becn) related to the VPs used by it. In a typical situation all the PPs along a VC are congested. But, if the VPs used by the VC are lightly loaded, this VC has a current service rate (VC SR) that can be substantially higher than its VC-CIR. This example illustrates the isolation of traffic that can be achieved by application of the VPN concept in accordance with the invention.

C. Transfer Plane Summary

There are several aspects of VPN operation that may be derived from the above-described concepts of identification of VCs and VPs, and traffic management and congestion control. Firstly, depending on its place in the network, a node can implement one or all of the three levels of traffic management described above. A pure cross-connect node (i.e., VP switch) will implement only the Phy-sap-level, a VC-switch node will implement the VP-sap and the Phy-sap levels, whereas an access node will implement all three levels. Alternatively a single node can be an access node for some VCs, a cross-connect node for some others, and a VC-switch for the remainder.

A network can dedicate part of its resources to VPNs and part to standard FR connections (for non-VPN customers).

All standard FR connections multiplexed on an egress port are associated with a pseudo VP, with the identifier dvpi, and to a queue, e.g., $VP_{dvpi}$ QUEUE. This queue is served at a rate at least equal to:

$$VP_{dvpi}SR = \sum_{i \in N(dvpi)} UCIR_i$$

where N(dvpi) is the index set of all VCs belonging to the pseudo-VP and $UCIR_i$ is the VC-CIR of the i-th such VC.

The congestion control approach discussed above calls for the introduction of a Phy-becn bit and the use of the becn bit (interpreted as a VP-becn indicator). If there were a free bit in the frame header to introduce the Phy-becn notification, then implementation of the congestion notification would be straightforward. However, in standard FR frames, no such bit can be found. Therefore, in order to implement the proposed congestion notification scheme in accordance with the present invention, one could provide an additional byte to the data portion of frames at the network ingress VC-terminator. The egress VC-terminator removes the extra byte before transmitting the data to the destination device. This byte could be used to hold the Phy-becn bit which, when set, would be used by the VP originators to determine the congestion state of the VP. If it is congested, the VP originator sets the VP-becn (becn) bit on all VCs which exceed their reserved CIR. This bit, once set, remains set for the VC no matter the congestion state of other VPs which it sees. The Phy-becn bit is cleared in any event. If this implementation approach were used, then it could be possible for VP terminators to use the extra bits in the new data byte for VC identification. The header address bits could be used for the VP identifier. In this way, all switches in the physical path used to carry the VP could switch on the VP identifier only.

2. Control Plane a. Routing

In a virtual private network there exists two levels of routing, one for virtual paths and one for virtual circuits. These two levels are described successively hereafter.

(1) Routing Virtual Paths (establishment of a VP)

A VP is defined by the same set of parameters as a standard FR connection (FRC), e.g., destination address, Bc, Be and VP-CIR. The endpoints of a VP may be access nodes or transit nodes. The establishment of a VP is a distributed process. Each node along the route uses routing tables describing the physical network to select the next trunk toward the destination. The node reserves on this trunk the resources required by the VP and, finally, it updates the node's connection table.

As discussed above, there is no explicit field within the frame address field to identify VPs and VCs. A VP is identified implicitly by an appropriate coding of the connection tables. As a consequence, it is necessary to know beforehand how many VCs could be multiplexed on the VP. Each VC multiplexed on the VP has an entry in the connection table. All the VCs of a VP are bound together by the common fields ivpi, evpi and eport used for traffic management purposes.

The routing of VPs can be a natural extension of normal FRC routing in a Frame Relay network. For example, suppose the FR network has an automated scheme for determining a path for a FRC. Each is configured by merely specifying the FRC endpoints (e.g., by specifying the physical network locations and the ingress dlci and egress dlci) together with the required FRC-CIR (and perhaps other performance criteria). The path selection mechanism then tries to find a path which meets the performance criteria. The chosen path is composed of FRC-segments which traverse PPs each of which has sufficient resources available to ensure that all the performance requirements are satisfied (most particularly, the FRC-CIR).

A VP is simply a special case of a FRC in the following sense. The VP is bounded by VP-terminators as endpoints (corresponding to the FRC-terminators except that, typically these VP-terminators are not subscriber ports). A VP can be specified analogous to an FRC with the addition of two parameters of operation: (1) the identity of a VPN (or reserved subscriber) to which the VP belongs; and (2) the maximum number of VCs that may be multiplexed on this VP.

When a VP setup is required, just as FRC setup reserves bandwidth on PPs with sufficient CIR, the same path selection logic can be used to select PPs which satisfy the CIR requirements of the VP. In a given cross-connect node, once an egress port with enough resources has been found, the connection table is updated. Referring again to FIG. 7, suppose, for example, three VCs can be multiplexed on the VP, the egress port selected is port 9, and the three available egress dlci values selected are 328, 7 and 192. Locally the VP which is to be set up will be identified by ivpi y and evpi 3. Three entries are reserved in the ingress port connection table and updated appropriately with the information provided above. The involvement of the node in the establishment of VCs on this VP stops here. If the VP is bidirectional, it is convenient to use the same routing information in both directions, i.e., for each entry of the connection table at the ingress port, there must be a symmetrical entry (edlci, evpi, idlci, iport) in the connection table of the egress port to describe the reverse path direction.

To summarize, the process of setting up a portion of a VP (with required CIR and bearing capability for up to n VC segments), done locally in each node traversed, consists of: (1) finding an outgoing trunk with an available bandwidth no smaller than VP-CIR and with at least n unused dlcis; (2) reserving these resources; and (3) updating the connection table by mapping an incoming dlci to an outgoing dlci and an evpi for every VC segment.

(2) Routing Virtual Circuits

The set of VPs established for a customer constitutes the customer's virtual private network. The VPN topology can be quite different from the underlying global FR network topology. The VPN nodes, which are VC switches only (cross-connect nodes are invisible to the VPN), are linked by VPs. Each VP is defined by its bandwidth (the VP-CIR) and the maximum number of VCs multiplexed on it. Moreover, each VC segment is identified by a dlci at the ingress and at the egress of the VP.

When a VC has to be established on a VPN, e.g., $VPN_i$, the same sub-tasks performed for establishing a VP have to be carried out in the $VPN_i$ nodes. First, a VP belonging to $VPN_i$ toward the destination and having at least the available bandwidth requested by the VC and an unused VC segment (i.e., an unused dlci) must be found. These resources must be reserved and the connection table updated. The connection is updated as described above with the additional requirement that the egress vpi (evpi) must be selected and identified as belonging to $VPN_i$.

The VC setup procedure offers varying degrees of automation. For example, if the manager of the underlying FR network selects a completely manual approach, it performs off-line the above first two sub-tasks from its knowledge of the VPN topology and state. Then it updates remotely the connection tables in each node along the VC route according to the configuration chosen.

Alternatively, the FR network manager may elect to build the routing tables corresponding to the VPN topology off-line and download this topology into the nodes. The three routing sub-tasks are performed in a distributed way. In this case the FR network manager configures the VPs for the VPN. Once the VPs are configured, the switches (nodes) in the network automatically perform the routing sub-tasks for the VCs. This requires adjacent VP nodes to be interconnected by a signaling link on which are transmitted the messages they exchange, as described in greater detail hereinafter.

The network manager may also elect to completely automate the VC setup procedure. This encompasses, in addition to the three routing sub-tasks, a distributed function to build and maintain the routing tables specific to the VPN. This function limits itself to describing the VPN topology. In particular, the FR network manager need only specify the end points of each VP. Thereafter, the VPs and VCs are automatically routed. As described above, in specifying (defining) the end points, the FR network manager must (1) determine the specific end point locations; (2) provide the identity of a VPN to which the VP will belong; and (3) provide the maximum number of VCs that will be multiplexed on the VP. Only the nodes belonging to the VPN under consideration are active in this task. The accomplishing of the three sub-tasks is performed in a distributed way with adjacent VP nodes communicating with each other by means of a signaling link, as described below.

b. Signaling

The nodes of a VPN need to exchange messages among themselves. These messages are related to the VC-setup, supervision and tear down functions. These messages can also be related to VPN management functions (e.g., monitoring of a VP).

The most convenient way to allow this exchange of messages is to associate a signaling VC to each VP. This connection is established between the two terminators of the VP. This special VC can be multiplexed on the VP along with user VCs or it can use a physical route totally different from that of the VP. Of course, a suitable protocol must exist at the two ends of the signaling VC in order to provide a reliable exchange of information between the two VP nodes.

3. Management Plane a. Introduction

The VPN of the present invention allows improved management functions to a VPN network manager. These management functions naturally interact with the management of the underlying FR network.

Figure 9:
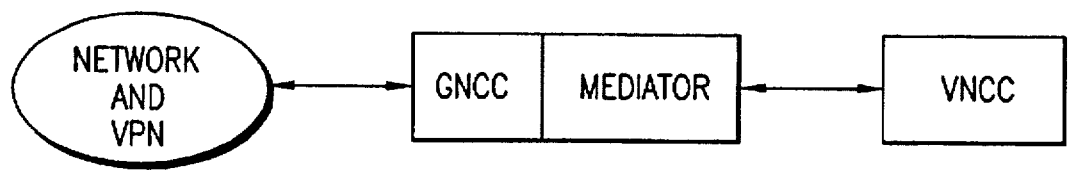
FIG. 9 is a schematic block diagram showing the relationship between a general network control center (GNCC) and a virtual private network control center (VNCC)

Referring to FIG. 9, and in accordance with the invention, there is a distribution of responsibilities between a General Network Control Center (GNCC) and a VPN Network Control Center (VNCC). The GNCC has complete control over the underlying FR network. This includes the control over the resources allocated to the VPN. The VNCC has a knowledge limited to its VPN. This knowledge is in terms of virtual resources (VPs, VCs, VPN topology, etc.). The operator of the VNCC is unaware of the actual resources (e.g., cards, transmission lines) used in the FR network and it has no direct access to the FR devices.

A mediation function, located between GNCC and VNCC, enables communications between the two entities. In the direction GNCC to VNCC, the mediation function filters the messages received from the network (alarms, statistics, accounting, etc.), and passes to the VNCC, in proper format, only those messages to which the VPN has involvement. In the direction VNCC to GNCC, the mediator screens VNCC messages to ensure that they are properly formatted and restricted to the VPN's virtual resources and are confined to the management level appropriate to the allowed VPN management capabilities.

The tasks of the mediator could be complex since this system must translate the physical information from the underlying FR network to the logically configured VPN with its VPs often not directly corresponding to actual equipment in the FR network. However, in order to establish VPN VPs in an automated manner, the network elements must have sufficient knowledge of the VPN virtual structure. With this information, they can determine the condition of VPN VPs, and send appropriate event information about VPN VP- and VC-related conditions with sufficient additional data to permit the mediation function to become straightforward.

b. Network Management Functional Areas

Management activities carried out by the GNCC and VNCC can be broken down in five functional areas: configuration, fault, accounting, performance and security management.

(1) Configuration Management

The configuration management functional area is composed of three main tasks. The first task involves the creation of a graphical topology of the FR network and each VPN, including a representation of the network elements, their connections and their logical position. This description may have several levels of abstraction. It allows the Fault Management to display graphically network events to the operator, e.g., FR network events to the FR network operator, and VPN events to the appropriate VPN operators.

The next task includes the specification of configuration parameters. All the elements of each VPN (including VPs, VCs and FR switching equipment) are described parametrically. The parameters drive tabular representations used by network elements to specify their environment and capabilities. The framework for the specification is a (graphical) representation of the FR network.

The third task involves the downloading of configuration parameters to the nodes (switches). This task allows each switch to initialize in its correct configuration.

The GNCC performs all these tasks for the whole network. On one hand, a VNCC may have no configuration management capabilities. On the other hand, it may provide varying configuration management functionality to its VPN (up to and including total management), but only under the ultimate control of the GNCC (through the mediator).

(2) Fault Management

This function provides for the detection and correction of abnormal network operations through the collection of information about events that affect the state of switch resources. The GNCC receives alarms and statistics from the network switches. This information is processed by fault management applications and is used to present fault indication on the graphical network topological view. Some degree of fault resolution can be initiated by GNCC-resident applications driven by operator input or by automatic invocation in response to specific alarm and statistical information.

The faults affecting the VPN are converted into VPN-level faults. For example, if a physical line in the network goes down, the fault may be converted to one or more VP failures to be sent to the VNCC as VPN faults. (It may be the case that a physical line failure does not generate any VP failure faults especially if the underlying networks has been able to reroute the VCs without disturbing the VP-terminator ports. In this case the VP appears to be functioning normally.) The VNCC fault management applications present this information as fault indications on the graphical topological view of the VPN.

The VNCC may undertake VPN fault correction actions. These actions are screened and translated by the mediator. Appropriate actions are forwarded to the GNCC which actually initiates the fault resolution communications with network elements.

(3) Accounting Management

This function collects the data regarding the usage and accounting, so that users can be billed. The VPN is a single customer from the point of view of the billing function. However, the VPN resources are shared among several VPN users who may need to be billed individually by the VPN administration. To provide this capability, the GNCC forwards the accounting records involving VPN usage through the mediator (which converts the records to an acceptable format) to the VNCC. The VNCC takes the necessary actions to drive the billing of the VPN's individual users.

(4) Performance Management

Performance Management collects data regarding switch resource performance levels and identifies the problems useful for network configuration, analysis, trending and planning. There are two types of performance information of interest. The first type is historical information which is vital to spotting network trends with regard to traffic patterns, congestion, line quality, hardware deterioration, etc. The second type deals with almost real-time data, useful in fault diagnosis and resolution.

Typically, the network elements report historical information to the GNCC as statistical data. The GNCC/mediator scans the statistical information and assemblies the data pertinent to the VPN for formatting and shipment to the VNCC. The almost real-time data is usually resident in the network elements. This information is obtained by query from the GNCC. For VPN-related data, the VNCC must query the network elements. The underlying network administration has the responsibility of ensuring that the VNCC operations are in no way permitted to obtain unauthorized transmittal of data not directly concerning the VPN. Therefore, VNCC queries are translated and screened by the mediator and passed to the GNCC for ultimate transmittal. Alternatively, the network elements may have sufficient screening capability to permit VNCC queries to be made directly. In this case, each network element must only allow queries for information appropriate to the VPN.

(5) Security Management

Security Management controls the access, the scope and the activity of network managers invoking NMS actions on a given entity. The actions can range anywhere from passive monitoring of network activity all the way to active configuration and fault resolution actions. In this connection, it is incumbent on the underlying network to ensure that VNCC activities are restricted to the VPN. Even passive monitoring must be restricted so that the VNCC is not inadvertently given information outside of its sphere of operations. When the VNCC has the capability of altering the parameters of operation of its VPN, the security requirements are among the chief concerns since operations even to VPN-controlled resources could affect the rest of the network community outside the scope of the VPN.

To provide the necessary security, all VNCC activities are filtered by the GNCC/mediator before any direct network activity is launched. The GNCC is ultimately the source of any such VPN-related activities. In effect, the VNCC becomes a remote operator of the GNCC with restrictions applied just as if it were a user with restricted network access.

Alternatively, VNCC operation may be directed to a security server for access to a network element. Once the clearance to the network element has been established, the network element restricts any activity of the VNCC to just those resources under the scope of the VPN. This type of security partnership allows the VNCC to operate independently from the GNCC. But, at the same time, it introduces its own set of management challenges for the GNCC. In effect, the GNCC has lost control over part of its management domain while still retaining overall management responsibility. For this reason, security solutions which bypass the GNCC are difficult to implement and control.

B. Applications of the VPN Concept

The concept of VPN definition and management in accordance with the invention provides powerful solutions to practical networking problems. Several examples are presented as illustrations.

1. Rapid Restoration of Service

In case of a network failure (e.g., a cut physical cable bearing a trunk), all the connections impacted by the failure must be restored as quickly as possible. In a network not having the VPN VP switching capability, each individual connection must be reestablished independently from the other connections which were using the same disrupted network element.

The VP concept allows a quicker and simpler restoration. Only the VPs impacted by the network failure have to be reestablished. Once a VP has been restored, assuming that the physical network has enough resources available to establish a restored path, the VP-terminators at both ends of the VP must update the connection tables such that the VC-segment restored for each VC multiplexed on the VP can be concatenated anew with the upstream and downstream VC-segments still set-up.

There is additional dimension to this restoration process. When a VP is able to be restored, the VCs multiplexed on the VP remain intact. Thus there is no failure of the VP from the perspective of the VPN subscriber (although there is a failure from the perspective of the physical network). The management implication is that fault messages must be generated to the GNCC, but not a VNCC managing the VPN.

2. Isolation of Traffic Between Users

A fundamental principle of the VPN concept is that, on any VP, the bandwidth available to the VCs routed across the VP is at least equal to VP-CIR. Additionally, the VP bandwidth can increase up to the transmission link bandwidth when the physical path is lightly loaded.

The VPN manager has a certain freedom in the usage policy of the VPN resources. On the other hand the manager has a higher responsibility in controlling the inbound traffic of the VPN. This is illustrated in the two examples below:

a. Maximum Bandwidth in a Congested Network

If, on a given route in a VPN, only one connection is active, then this connection can use a bandwidth equal to the narrowest VP along this route. This is true even if one of the trunks along the route is congested.

With this feature it makes sense for a VC to subscribe to an Excess Information Rate (EIR) equal to the VP-CIR. Once the VC has reached its maximal rate EIR, it can transmit continuously at this rate even on a highly loaded network as long as none of the VPs transited require a decrease due to congestion. Even when such a decrease is necessary, the VC is still guaranteed a transmission rate of VC-CIR.

It is the responsibility of the VPN manager to specify the maximum allowed usable CIR on a VP, a percentage of the VP-CIR. Multiple VCs can be carried on a VP so long as the sum of their VC-CIRs do not exceed the usable VP-CIR. In this manner individual VCs carried by the VP may exceed their individual VC-CIRs for bursts without causing VP congestion.

b. Grouped CIR

The concept of the Grouped CIR (statistical CIR) feature relates to the CIR's of a group of connections at a single access point. Several connections are established from the single access to several destinations, the sum of their CIRs is higher than the access rate. Thus the VCs emanating from this access at any point in time have an aggregate (or 'Grouped') CIR bounded by the access rate. By considering all of these VCs as a group, the transit network needs to allocate no more than the access rate for CIR even if the sum of the individual CIRs of the VCs in the group exceed the access rate. The VP carrying such a VC group has less CIR requirement than would be necessary if it treated the VCs of the group individually.

Figure 10:
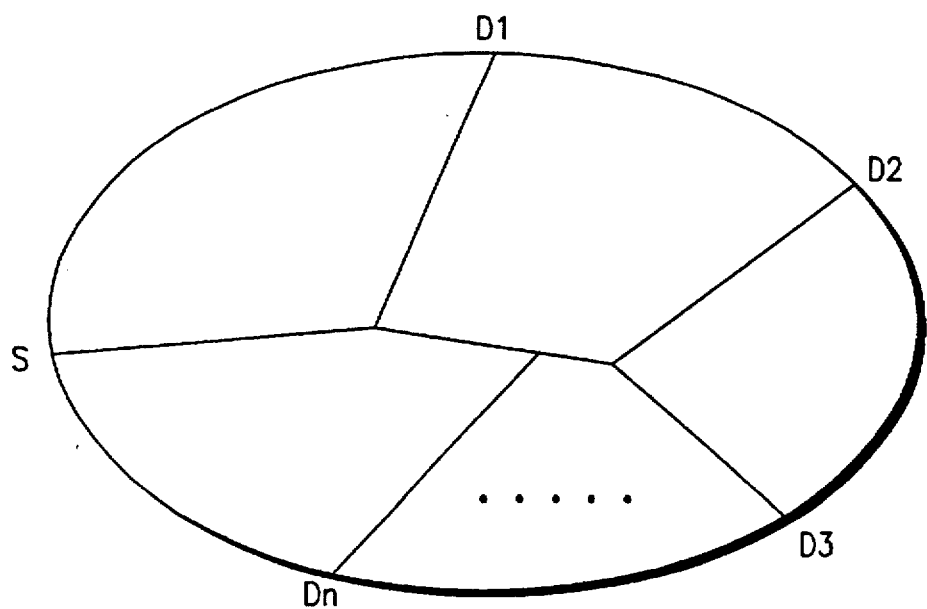
FIG. 10 is a schematic block diagram of a virtual private network configured to support group committed information rate (CIR).

Referring to FIG. 10, the VPN concept of the present invention provides a graceful way to support this Grouped CIR feature and to extend it. For example, a client has n connections to establish between a single access and n distinct destination. At any given time the source does not generate a rate higher than X kbps (X kbps being equal to the access rate or to a lower value). To satisfy this requirement one creates a VPN as illustrated in FIG. 10 where, for each VP, a bandwidth equal to X kbps is reserved. Then n zero-CIR connections are established, one from the source (S) to each of the destinations (D1, D2, . . . , Dn) on this VPN. As long as the aggregate rate at S is not higher than X kbps, the traffic submitted to the VPN will be transmitted without discard.

Several variants to this basic scheme are possible. For example each VC, with source at S, has its own CIR. In this case the VP-CIR reserved for a given VP should be equal to: min [X kbps, ΣCIR of VCs multiplexed on the VP].

The grouped CIR feature can be extended to the case of multiple sources. The requirement is that the aggregate bandwidth reserved on any trunk for the n connections originating from multiple sources cannot exceed X kbps.

The grouped CIR feature can be extended to the case of multiple sources each converging on a single egress access line of bandwidth Y kbps. In this case, a VPN can be established in a manner similar to FIG. 10 (treating S as the egress access and $D_1, D_2, \ldots, D_n$ as the sources). The VP-CIR reserved for each of the VPs in the VPN is set equal to: min [Y kbps, ΣCIR of the VCs multiplexed on the VP]. By so limiting the VP-CIRs, no more than Y kbps of traffic will ever be transmitted in any VP of the VPN. Moreover, in case of congestion the traffic will be throttled as close to the sources as possible.

Although the invention has been described and illustrated with respect to a FR network, the present invention is equally applicable to other packet switching networks. For example, an asychronous transfer mode (ATM) network includes virtual circuits and virtual paths. As opposed to a FR network, a VP is an actual logical entity in an ATM network. The ATM packets in the ATM network may be provided with address information to uniquely identify a packet as belonging to a specific VPN in accordance with the present invention.

Although the invention has been described and illustrated with respect to exemplary embodiments thereof, it should be understood by those skilled in the art that the foregoing, and various other additions and omissions may be made therein and thereto without departing from the spirit and scope of the present invention.

We claim:

1. A packet-based network for providing virtual private networks, each virtual private network carrying traffic associated with a particular customer of the packet-based network, the traffic including packets for transmission via the packet-based network, the packet-based network comprising:
   a plurality of network elements, each being interconnected to at least one other network element by a physical path;
   a plurality of customer premises equipment, each being interconnected to a network element by a physical path;
   at least one virtual path, each being a logical connection between two virtual path terminators;
   at least one virtual circuit, each being a logical connection established between two virtual circuit terminators, wherein packets are transmitted by said virtual circuits between the virtual circuit terminators;
   wherein the virtual private network includes a collection of packet-based network resources including respective network elements, customer premises equipment, virtual paths and corresponding virtual circuits, the collection of packet-based network resources making up the virtual private network providing a level of service to the traffic associated with the particular customer of the packet-based network which is independent of all other traffic on the packet-based network which is outside of the virtual private network's logical domain; and
   identification means contained in the packets of a respective customer having a virtual private network for identifying the respective virtual circuits and virtual paths used by the virtual private network to which the packets are associated.

2. A packet-based network according to claim 1, wherein said identification means is a local identifier of the respective virtual circuits and virtual paths used by the virtual private network, and wherein the packet-based network further includes means for updating said identification means during transmission of the packet of a respective customer within the packet-based network.

3. A packet-based network according to claim 1, wherein:
   each virtual path is made up of at least one virtual path segment which is a portion of a virtual path using a particular physical path; and
   each virtual circuit is made up of at least one virtual circuit segment which is a portion of the virtual circuit carried by a virtual path between two adjacent network elements, between two adjacent customer premises equipment, or between adjacent network elements and customer premises equipment.

4. A packet-based network according to claim 3, wherein virtual circuit and virtual path terminators include both network elements and customer premises equipment.

5. A packet-based network according to claim 1, wherein said identification means includes an address field having a fixed length virtual circuit identifier field and a fixed length virtual path identifier field to uniquely identify the virtual circuit and virtual path over which the packet of information will travel.

6. A packet-based network according to claim 1, wherein said identification means includes an address field made up of variable length subfields including a class type field, a virtual path identifier field and a virtual circuit identifier field to uniquely identify the virtual circuit and virtual path over which the packet of information will travel, said class type field identifying the length of the virtual path identifier field and virtual circuit identifier field.

7. A packet-based network according to claim 1, wherein said identification means includes an address field in said packets, said address field being an integrated field which identifies virtual paths and virtual circuits over which the packet of information will travel, said integrated field being encoded to uniquely identify how a frame of information is switched within said network elements.

8. A packet-based network according to claim 7, wherein each network element includes a connection table which identifies how a packet is routed within the network element based on the value of the integrated address field.

9. A packet-based network for providing virtual private networks, each virtual private network carrying traffic associated with a particular customer of the packet-based network, the traffic including packets for transmission via the packet-based network, the packet-based network comprising:

- a plurality of network elements, each being interconnected to at least one other network element by a physical path:
- a plurality of customer premises equipment, each being interconnected to a network element by a physical path;
- at least one virtual path, each being a logical connection between two virtual path terminators;
- at least one virtual circuit, each being a logical connection established between two virtual circuit terminators, wherein packets are transmitted by said virtual circuits between the virtual circuit terminators;
- wherein the virtual private network includes a collection of packet-based network resources including respective network elements, customer premises equipment, virtual paths and corresponding virtual circuits;
- identification means contained in the packets of a respective customer having a virtual private network for identifying the respective virtual circuits and virtual paths used by the virtual private network to which the packets are associated; and
- wherein each virtual path on a physical path of the network is allocated a respective positive guaranteed bandwidth, and wherein when congestion occurs on a physical path, only a virtual path using bandwidth greater than the respective positive guaranteed bandwidth is required to reduce submission rate of packets onto the network.

10. A packet-based network according to claim 9, wherein the bandwidth utilization of each virtual path within the virtual private network is monitored, and wherein when one virtual path is utilizing less than its respective positive guaranteed bandwidth, any excess bandwidth is equally shared among the remaining virtu paths on a respective physical path in proportion to the respective positive guaranteed bandwidth of the remaining virtual paths with respect to a total bandwidth of the respective physical path.

11. A packet-based network according to claim 9, wherein each virtual circuit is provided with a virtual circuit bandwidth on a respective virtual path, and wherein even if the physical path utilized by a virtual circuit is congested, if the respective virtual path is lightly loaded, the virtual circuit can utilize bandwidth at least equal to or greater than its virtual circuit bandwidth.

12. A packet-based network for providing virtual private networks, each virtual private network carrying traffic associated with a particular customer of the packet-based network, the traffic including packets for transmission via the packet-based network, the packet-based network comprising:

- a plurality of network elements, each being interconnected to at least one other network element by a physical path;
- a plurality of customer premises equipment, each being interconnected to a network element by a physical path;
- at least one virtual path, each being a logical connection between two virtual path terminators;
- at least one virtual circuit, each being a logical connection established between two virtual circuit terminators, wherein packets are transmitted by said virtual circuits between the virtual circuit terminators;
- wherein the virtual private network includes a collection of packet-based network resources including respective network elements, customer premises equipment, virtual paths and corresponding virtual circuits;
- identification means contained in the packets of a respective customer having a virtual private network for identifying the respective virtual circuits and virtual paths used by the virtual private network to which the packets are associated; and
- means for establishing a virtual path within the packet-based network locally at each network element traversed by the virtual path, said means for establishing a virtual path including:
  - means for identifying an outgoing physical path from a network element with available bandwidth to support a guaranteed bandwidth of the virtual path and able to support a number of virtual circuits carried by the virtual path;
  - means for reserving resources on the physical paths, the reserved resources being indicative of the virtual path bandwidth and number of virtual circuits carried by the virtual path; and
  - means for updating a connection table in the network element by mapping incoming virtual circuits and virtual paths to respective outgoing virtual circuits and virtual paths.

13. A packet-based network according to claim 12 further including means for establishing a virtual circuit within a virtual private network including:

- means for identifying a respective virtual path towards a destination having at least the available bandwidth required by the virtual circuit and an unused virtual circuit segment;
- means for reserving resources for the virtual circuit on the respective virtual path, the reserved resources for the virtual circuit being indicative of the virtual circuit bandwidth and the virtual circuit segment on the respective virtual path; and
- means for updating the connection table within the network element.

14. A packet-based network according to claim 12, further including means for establishing a signalling virtual circuit on each virtual path.

15. A packet-based network for providing virtual private networks, each virtual private network carrying traffic associated with a particular customer of the packet-based network, the traffic including packets for transmission via the packet-based network, the packet-based network comprising:

- a plurality of network elements, each being interconnected to at least one other network element by a physical path;
- a plurality of customer premises equipment, each being interconnected to a network element by a physical path;
- at least one virtual path, each being a logical connection between two virtual path terminators;
- at least one virtual circuit, each being a logical connection established between two virtual circuit terminators, wherein packets are transmitted by said virtual circuits between the virtual circuit terminators;

wherein the virtual private network includes a collection of packet-based network resources including respective network elements, customer premises equipment, virtual paths and corresponding virtual circuits;

identification means contained in the packets of a respective customer having a virtual private network for identifying the respective virtual circuits and virtual paths used by the virtual private network to which the packets are associated, and a physical service access point for each respective physical path which multiplexes all packets to be transmitted on the respective physical path, the physical service access point including a physical path queue which is served at a physical path rate, the physical path queue being shared by all virtual paths multiplexed on to the respective physical path.

16. A packet-based network according to claim 15 wherein a physical path congestion threshold is determined based on the maximum amount of packets stored in the physical path queue and waiting for transmission on to the respective physical path, and wherein a congestion notification is provided to each of the virtual paths multiplexed onto the respective physical path in response to the length of the physical path queue exceeding the physical path congestion threshold.

17. A packet-based network according to claim 16 wherein said congestion notification includes an additional bit in each packet.

18. A packet-based network according to claim 16 wherein said congestion notification includes a signaling frame transmitted from the physical service access point to each of the virtual paths multiplexed on the physical service access point.

19. A packet-based network according to claim 16 wherein:

each of the virtual paths multiplexed onto the respective physical path is allocated a corresponding positive guaranteed bandwidth;

the sum of the positive guaranteed bandwidth for all of the virtual paths multiplexed onto the respective physical path is less than a total bandwidth of the respective physical path, and in response to said physical path congestion notification, each virtual path multiplexed onto the respective physical path reduces the submission rate of packets to the physical path queue to a level no greater than the corresponding positive guaranteed bandwidth.

20. A packet-based network according to claim 16 further including a virtual path service access point for each respective virtual path which multiplexes all packets to be transmitted on the respective virtual path from virtual circuits, the virtual path service access point including a virtual path queue which is served at a virtual path rate, the virtual path queue having a congestion threshold indicative of a maximum allowed virtual path queue length, the virtual path service access point providing a virtual path congestion notification to the virtual circuits carried by the respective virtual path in response to the length of the virtual path queue exceeding the virtual path queue threshold.

21. A packet-based network according to claim 20 wherein:

each of the virtual circuits multiplexed onto the respective virtual path is allocated a corresponding virtual circuit bandwidth;

the sum of the virtual circuit bandwidth for all of the virtual circuits multiplexed onto the respective virtual path is less than a guaranteed bandwidth of the respective virtual path, and in response to the virtual path congestion notification, each respective virtual circuit multiplexed onto the respective virtual path reduces the submission rate of packets to the virtual path queue.

22. A packet-based network according to claim 21, wherein in response to persistence of said virtual path congestion notification after the reduction of the submission rate by each respective virtual circuit, each respective virtual circuit incrementally reduces submission rate until said virtual path congestion notification is removed, the respective virtual circuit only reducing submission rate to a level no greater than the corresponding virtual circuit bandwidth.

23. A packet-based network for providing virtual private networks, each virtual private network carrying traffic associated with a particular customer of the packet-based network, the traffic including packets for transmission via the packet-based network, the packet-based network comprising:

a plurality of network elements, each being interconnected to at least one other network element by a physical path;

a plurality of customer premises equipment, each being interconnected to a network element by a physical path;

at least one virtual path, each being a logical connection between two virtual path terminators;

at least one virtual circuit, each being a logical connection established between two virtual circuit terminators, wherein packets are transmitted by said virtual circuits between the virtual circuit terminators;

wherein the virtual private network includes a collection of Racket-based network resources including respective network elements, customer premises equipment, virtual paths and corresponding virtual circuits;

identification means contained in the packets of a respective customer having a virtual private network for identifying the respective virtual circuits and virtual paths used by the virtual private network to which the packets are associated; and wherein a pseudo virtual path is provided on each physical path to carry traffic not associated with a virtual private network.

24. A packet-based network according to claim 23, wherein each virtual path and the pseudo virtual path on a physical path of the network is allocated a respective positive guaranteed bandwidth, and wherein when congestion occurs on a physical path, only a virtual path or pseudo virtual path using bandwidth greater than the respective positive guaranteed bandwidth is required to reduce submission rate of packets onto the network.

25. A packet-based network according to claim 24, wherein the bandwidth utilization of each virtual path within the virtual private network is monitored, and wherein when one virtual path is utilizing less than its respective positive guaranteed bandwidth, any excess bandwidth is equally shared among the remaining virtual paths on a respective physical path in proportion to the respective positive guaranteed bandwidth of the remaining virtual paths with respect to a total bandwidth of the respective physical path.

26. A packet-based network according to claim 24, wherein each virtual circuit is provided with a virtual circuit bandwidth on a respective virtual path, and wherein even if the physical path utilized by a virtual circuit is congested, if the respective virtual path is lightly loaded, the virtual circuit can utilize bandwidth at least equal to or greater than its virtual circuit bandwidth.

27. A packet-based network for providing virtual private networks, each virtual private network carrying traffic associated with a particular customer of the packet-based network, the traffic including packets for transmission via the packet-based network, the packet-based network comprising:

- a plurality of network elements, each being interconnected to at least one other network element by a physical path;
- a plurality of customer premises equipment, each being interconnected to a network element by a physical path;
- at least one virtual path, each being a logical connection between two virtual path terminators;
- at least one virtual circuit, each being a logical connection established between two virtual circuit terminators, wherein packets are transmitted by said virtual circuits between the virtual circuit terminators;
- wherein the virtual private network includes a collection of packet-based network resources including respective network elements, customer premises equipment, virtual paths and corresponding virtual circuits,
- identification means contained in the packets of a respective customer having a virtual private network for identifying the respective virtual circuits and virtual paths used by the virtual private network to which the packets are associated;
- a general network control center (GNCC) for controlling the packet-based network;
- at least one virtual private network control center (VNCC), each respective VNCC being associated with a corresponding virtual private network; and
- mediation means located between the GNCC and each respective VNCC for enabling communications therebetween;
- wherein for communication from the GNCC to the respective VNCC said mediation means filters messages received from the packet-based network to ensure that GNCC messages are properly formatted for the respective VNCC and passes to the respective VNCC only those messages which pertain to traffic of the corresponding virtual private network; and
- wherein for communication from the respective VNCC to the GNCC said mediation means screens VNCC messages to ensure the VNCC messages are properly formatted for the GNCC and to ensure that the VNCC messages are restricted to the packet-based network resources assigned to the corresponding virtual private network.

* * * * *

UNITED STATES PATENT AND TRADEMARK OFFICE
CERTIFICATE OF CORRECTION

PATENT NO. : 5,768,271
DATED : June 16, 1998
INVENTOR(S) : Seid et al.

It is certified that error appears in the above-identified patent and that said Letters Patent is hereby corrected as shown below:

At column 21, in line 48, "virtu" should be --virtual--.

At column 23, in line 11, "associated," should be --associated;--.

At column 24, in line 36, "Racket" should be --packet--.

At column 25, in line 25, "circuits." should be --circuits;--.

Signed and Sealed this

First Day of September, 1998

*Attest:*

BRUCE LEHMAN

*Attesting Officer*     Commissioner of Patents and Trademarks